United States Patent [19]

Dubots et al.

[11] Patent Number: 5,336,280
[45] Date of Patent: Aug. 9, 1994

[54] ABRASIVE AND/OR REFRACTORY PRODUCTS BASED ON MELTED AND SOLIDIFIED OXYNITRIDES AND PROCESS PREPARING THE SAME

[75] Inventors: Dominique Dubots, Passy; Pierre Faure, St Quentin sur Isere, both of France

[73] Assignee: Pechiney Electrometallurgie, Paris, France

[21] Appl. No.: 816,585

[22] Filed: Jan. 3, 1992

[30] Foreign Application Priority Data

Apr. 15, 1991 [FR] France ................ 91 05419

[51] Int. Cl.$^5$ .............................. B24D 3/00
[52] U.S. Cl. .............................. 51/293; 51/307; 51/308; 51/309; 501/87; 501/92; 501/96; 501/97
[58] Field of Search ............ 51/293, 307, 308, 309; 501/87, 92, 96, 97, 56

[56] References Cited

U.S. PATENT DOCUMENTS

| | | | |
|---|---|---|---|
| 4,406,669 | 9/1983 | Sarin et al. | 51/309 |
| 4,406,670 | 9/1983 | Sarin et al. | 51/295 |
| 4,421,528 | 12/1983 | Buljan et al. | 51/295 |
| 4,424,066 | 1/1984 | Sarin et al. | 51/309 |
| 4,426,209 | 1/1984 | Sarin et al. | 51/309 |
| 4,469,489 | 9/1984 | Sarin et al. | 51/295 |
| 4,609,631 | 9/1986 | Messier et al. | 501/56 |
| 4,650,773 | 3/1987 | Okamura et al. | 501/97 |
| 4,855,264 | 8/1989 | Mathers et al. | 51/307 |
| 4,940,678 | 7/1990 | Aitken | 501/56 |
| 4,957,883 | 9/1990 | Kobayashi et al. | 501/56 |
| 4,957,886 | 9/1990 | Mathers et al. | 51/307 |
| 5,023,212 | 6/1991 | Dubots et al. | 51/309 |

Primary Examiner—Mark L. Bell
Assistant Examiner—Willie J. Thompson
Attorney, Agent, or Firm—Pollock, Vande Sande & Priddy

[57] ABSTRACT

Abrasive and/or refractory products comprising at least one compound from the group of oxynitrides of one or more metals or metalloids (such as Al, Mg, alkaline earth metals, Si, Ti or Zr) and obtained by melting and solidification.

7 Claims, No Drawings

ABRASIVE AND/OR REFRACTORY PRODUCTS BASED ON MELTED AND SOLIDIFIED OXYNITRIDES AND PROCESS PREPARING THE SAME

TECHNICAL FIELD

The invention concerns molten and solidified abrasive and/or refractory products based on oxynitrides, one or more metals or metalloids, or dry mixtures thereof, or mixtures thereof with other products such as oxides, carbides, borides and the like.

STATE OF THE ART

Ceramics based on nitrides and oxynitrides which may also be used as refractory materials are known, but these are obtained by mixing the constituent powders (e.g. oxides and nitrides), shaping and fritting or reaction fritting, naturally or under pressure. These processes are difficult to carry out and the reaction between the powders in the mixture is sometimes slow and/or difficult to initiate, a situation which may lead to products with inadequate properties.

SUMMARY OF THE INVENTION

With their experience of the subject Applicants have developed abrasive and/or refractory products, which are characterised in that they are based on at least one compound from the group of oxynitrides of one or more metals or metalloids, and that they are obtained by melting, cooling and solidifying an initial solid charge which comprises at least one compound of said metals or metalloids containing oxygen and nitrogen, such as oxides, nitrides or oxynitrides.

It has been found, surprisingly, that oxynitrides have sufficient chemical stability to be melted, whereas the corresponding nitrides often decompose before melting.

The products according to the invention generally contain at least 5% of nitrogen and 5% of oxygen, but typically at least 50% of oxynitride.

DETAILED DESCRIPTION OF THE INVENTION

Elements, metals or metalloids which may be included in the formulation of the compounds to which the invention relates are Al and Mg in particular, but also alkaline earth metals (Ca, Sr, Ba), Si, Ti, Zr or still more generally transition elements of columns 3a, 4a, 5a and 6a (IUPAC version) in lines 4, 5 and 6 of the Periodic Table of Elements, including rare earths, and also B when at least one other of the preceding elements is already present. The compounds may be simple oxynitrides, that is to say, with only one of the elements just mentioned, or combined ones when they contain two or more of said elements, thus giving dispersions of a plurality of phases in one another, alloys, solid solutions, compositions and the like.

With the great variety of abrasive or refractory products obtained according to the invention, one can clearly select the compounds best adapted to the envisaged application, in view of their properties or combinations of properties; refractory properties, resistance to heat, abrasion or corrosion (for example hot in the presence of liquid metal), chemical inertness, low wettability, electrical resistivity or thermal conductivity, frittability, compatibility with binders or resins and the like.

The products according to the invention result from melting an initial solid charge comprising one or more compounds of the oxide, nitride or oxynitride type-to which carbides and/or borides may be added-of one or more elements (metals or metalloids), followed by their solidification and cooling. Simple or combined oxynitrides in particular may be melted and solidified as such, without previously mixing them with another of said compounds. Of these compounds, which form all or part of the initial charge, the following may be noted, although the invention is not restricted to these: $Al_2O_3$, $MgO$, $AlN$, $Al_3O_3N$, $Al_3MgO_4$, $Mg_3N_2$, $Al_4C_3$, $B_4C$, $BN$, $Si_3N_4$, etc.

The total composition of the initial charge may correspond to the production of defined compounds such as $Al_3O_3N$ etc., but may also cover much wider ranges, to give either mixtures of a plurality of solid phases or solid solutions such as SiAlON's of the $Si_{6-z}Al_zO_zN_{8-z}$ type, AlON's of the $Al_{(8-x)/3}O_{4-x}N_x$ type, spinels of the magnesia and AlON type etc.

The initial charge is generally made up of powders or more or less fritted products, previously obtained by various known means. For example, when the initial charge contains a metallic oxynitride, the latter may have been obtained by nitriding carbothermy of the corresponding metallic oxide, or more advantageously by direct nitridation of a metallic powder in the presence of a (non-fusible) refractory carrier, the chemical nature of which is selected according to the required oxynitride.

A convenient and important means of obtaining high enough temperatures to melt the initial solid charge-usually over 2000° C.-is to use electrothermal fusion in an arc furnace. Another means of obtaining fusion is to place at least one constituent of the initial charge, in solid form, in an already molten bath made up of the other constituents of the initial charge.

Fusion produces chemical compositions through reaction between the various compounds of the initial charge, and these compositions give the required phases when cooled.

When the melted products have solidified they may be cast and put into any possible forms: blocks, granules, shaped pieces (pieces de forme) etc. They may also be put into the form of a powder which is ground or crushed and sieved.

Cooling may be rapid (quenching), so as to preserve a fine grain structure in the final product while avoiding crystalline phases of large dimensions, so as to maintain good properties in the final product (e.g. thermal shock resistance). Thus the size of the grains is typically less than 100 $\mu m$.

The melted and solidified products according to the invention may be mixed-in the powder or particle state-with other addition compounds (also in the form of powder or particles). These addition compounds may firstly be abrasive or refractory materials which may or may not be electrically melted, for example oxides or oxide compounds (particularly refractory oxides such as $Al_2O_3$, $MgO$, alkaline earth metal oxides, calcined dolomite, spinels, $SiO_2$, $ZrO_2$, $TiO_2$ and rare earth oxides), carbides (such as those of Si, Al, Ca, B etc), borides (such as those of Al, Ti or Zr), nitrides (such as those of Al, Si, Ti, Zr or B), oxynitrides (such as SiAlON's or AlON's) or oxycarbides (such as those of Al), but also metals or metalloids in powder or particle form (particularly C, Al, Mg, Ca, Si or alloys thereof) which do not react with the other compounds.

The melted and solidified products according to the invention, or mixtures thereof with the addition compounds just described, may be crushed or ground to a powder. The powders obtained may be used to make all kinds of shaped pieces, particularly pieces which are fritted, produced by any known methods, such as pressing, casting or extrusion in the presence of binders and plasticiser, followed by natural fritting, fritting under pressure, HIP (hot isostatic pressing) or the like.

Some types of abrasive or refractory products according to the invention, which are thus obtained after melting and solidification, may be given as an illustration.

Thus the following may be prepared:
  simple oxynitrides, obtained e.g. after melting a charge of more or less fritted oxynitride powder previously obtained by the above-mentioned methods, or a charge of nitride and oxide of the same element, or a charge of oxynitride enriched with nitride and/or oxide, still of the same metal
  combined oxynitrides, obtained e.g. after melting a charge of oxynitrides of different elements, or of nitrides and oxides of different elements, or of nitride and oxynitrides of different elements, or of oxynitrides and oxides of different elements, or of combined oxynitrides enriched with nitrides and/or oxides
  oxycarbonitrides, obtained e.g. after melting a charge of oxynitride and carbide with the possible addition of nitride, oxide or even oxycarbide. As before, there may be only one element present (simple oxycarbonitride) or a plurality of elements (combined oxycarbonitride).

EXAMPLES

Example 1

This example illustrates the preparation of a simple $Al_3O_3N$ oxynitride enriched with $Al_2O_3$ according to the invention.

An initial charge made up of a mixture of the following powders:
  80% by weight of alumina from a Bayer process
  20% by weight of fritted $Al_3O_3N$ oxynitride
is placed in a three-phase arc furnace. The charge is melted at 2100° C. and cast in a steel ingot mould filled with spheres, also made of steel, to obtain a vigorous quenching effect. The solidified product is separated from the spheres by screening followed by magnetic sorting, then is made up in the usual way (grinding and screening) to obtain the required granulometric sections.

Analysis of the product obtained by X ray diffractometry enables an AlON phase to be identified, dispersed in a matrix which is a solid solution of AlON in corundum. Examination of a polished section reveals a very fine, compact texture. The grinding operation carried out at the making up stage confirms the exceptional abrasive properties of the product. Allowing for its composition, its refractory and abrasive properties are at least those described by ceramists for similar fritted products, and in addition its corrosion resistance is greatly improved.

Example 2

This example illustrates the preparation of a simple AlON oxynitride according to the invention.

A charge comprising 100% of fritted AlON is placed in the furnace of Example 1; as before, the product is melted at about 2200° C. without any trace of decomposition being noted; it flows very easily when the furnace is rocked.

The quenched product is made up in the same way as that in Example 1. Its abrasive and refractory properties are very similar to those of the product described in Example 1.

Example 3

This example illustrates the preparation of a combined oxynitride of the MgAlON type, according to the invention.

A charge comprising:
  50% by weight of sea water magnesia (Dead Sea periclase)
  50% by weight of fritted AlON
is placed in the furnace of Example 1. The charge is melted at about 2500° C. The contents of the furnace are cast rapidly to avoid any risk of coagulation.

When the product has been quenched, solidified, cooled and made up, phase identification reveals a two-phase product of a fine, compact texture comprising:
  an AlON spinel (a structure close to the classic $MgO-Al_2O_3$) spinel)
  periclase where the offsetting of the diffractometry beams indicates a solid solution.

The product is found to have chemical inertness which is exceptional and unexpected in molten lithium and boron salts, and a refractory property which is equally exceptional and unexpected.

The product may also be used as an electrical insulating agent in the manufacture of metal clad electrical heating resistors, since it has both good thermal conductivity and very high electrical resistivity. For this application it has a decisive advantage over magnesia, which is normally used, for it keeps its electrical properties at temperatures at which magnesia loses its electrical insulating properties (1300° C.).

Example 4

This example illustrates the preparation of a combined oxynitride containing boron, according to the invention.

A charge comprising the following mixture:
  45% by weight of alumina from the Bayer process
  45% by weight of AlON
  10% by weight of boric anhydride $B_2O_3$.
is placed in the furnace of Example 1. Melting and casting are carried out under the conditions described in Example 1. During the making up operations, particularly grinding, the product is found to be an exceptionally good abrasive.

The product obtained has a very fine texture, and examination by X-ray diffractometry shows it to consist of a suspension of hexagonal boron nitride in an aluminalon matrix of the type in Example 1. In addition to its abrasive properties the product is an excellent refractory material, particularly adapted to the following applications: refractory materials for continuous casting of steel, and refractory materials designed to contain melted aluminium alloys.

Example 5

This example illustrates the preparation of a combined oxynitride of the MgCaAlON type according to the invention.

A charge comprising the following mixture:

80% by weight of dolomite (MgO—CaO)
20% by weight of AlON
is placed in the furnace of Example 1. Electrical melting and casting with quenching are carried out as before.

A product of a fine structure is obtained. The phases cannot easily be identified by analysis by X-ray diffractometry, owing to the presence of compounds which have not yet been listed in the tables. A test on reactivity with water has produced the surprising and particularly interesting result that the product does not appear to show any reaction although it contains calcium compounds. Thus it is a refractory material which may be substituted for dolomites, with the advantage of being inert relative to humidity.

Example 6

This example illustrates the preparation of an oxycarbonitride of the AlCON type according to the invention.

A charge comprising the following mixture:
50% by weight of Bayer alumina
40% by weight of AlON with
20% by weight of aluminium carbide $Al_4C_3$ added to it
is placed in the furnace of Example 1. Electrical melting and casting with quenching are carried out as before.

After the making up process chemical analysis of the product (which is compact with a fine structure) shows it to contain:
8% by weight of carbon
15% by weight of nitrogen.

As in Example 5, not all the phases can be identified, owing to the presence of compounds which have not yet been listed. Here again the grinding operation demonstrates the remarkable abrasive action of the product.

Example 7

This example illustrates first the preliminary preparation of a fritted combined oxynitride of the MgBON type, then the preparation of a refractory product by melting and solidification, according to the invention.

At the first stage a charge comprising the following special mixture is placed in an oven-type furnace:
30% by weight of boric anhydride $B_2O_3$
30% by weight of MgO
40% by weight of granulated Mg.

The furnace is then heated in a nitriding atmosphere (nitrogen) in order to produce exothermic nitridation at about 1700° C. and to obtain a fritted material consisting of periclase and hexagonal boron nitride. Analysis of the fritted material shows it to result from nitridation of Mg, followed by decomposition of the magnesium nitride ($Mg_3N_2$ - - - $3Mg+N_2$), then reduction of $B_2O_3$ ($3Mg+B_2O_3 \rightarrow 3MgO+2B$) and nitridation of the boron ($2B+N_2 \rightarrow 2BN$); thus it will be seen that a metalloid (B) is formed in situ through metallothermal reduction of its oxide ($B_2O_3$) by magnesium, the magnesium emanating from high temperature thermal decomposition of $Mg_3N_2$ which is formed at a lower temperature.

At the second stage the fritted material is placed in the furnace of Example 1. It is melted at about 2800° C. then cast rapidly in view of the high temperature used. When the product has solidified and been made up, analysis by X-ray diffraction shows it to contain:
periclase (MgO) with slightly offset diffraction beams
hexagonal boron nitride (BN) dispersed in the periclase matrix.

This product may have the following applications:
firstly a refractory material with the same fields of use as electrically melted magnesias (with the advantage of having still greater inertia relative to liquid metals and non-wettability provided by the boron nitride)
secondly applications where magnesia is used as a compound with good thermal conductivity and high electrical resistivity. Here again the presence of hexagonal boron nitride, which is a good conductor of heat and a very good electrical insulator at high temperature, gives the product according to the invention an excellent performance.

Example 8

This example illustrates the preparation of a combined oxynitride of the AlTiON type enriched with $Al_2O_3$ from brown corundum ($Al_2O_3+TiO_2$), according to the invention.

For this purpose a melted mass of brown corundum (obtained by reducing melting of bauxite) is placed in the furnace of Example 1, the mass is cast and a ground AlON powder is added to the pouring stream. After solidification and making up, a refractory product with surprising abrasive properties is obtained.

Analysis by X-ray diffractometry reveals the presence of a solid solution of Ti nitride and oxynitrides.

Thus the superior abrasive properties of the product, which are confirmed by abnormal wear on the grinders, result from:
the presence of Ti nitride and oxynitride which improve the tribology of the abrasive
the fine multi-phase structure of the product which improves its mechanical properties
the fact that AlON is put into solid solution in the corundum structure, which produces a favourable change in the mechanical properties of the matrix.

The invention is not restricted to the examples described, and other products according to the invention may be prepared from other starting mixtures:
in the case of simple oxynitrides one may, for example, start with $AlN+Al_2O_3$ (or AlON) mixtures
in the case of combined oxynitrides one may, for example, start with mixtures of
$AlN+MgO$
$AlN+$dolomite
$AlN+B_2O_2$
$AlN+TiO_2$.

These mixtures may be enriched with $Al_2O_3$ and/or MgO, CaO or other oxides, carbides or nitrides.

Thus compositions of the products according to the invention are very varied and the structures are also very diverse. For example, one can find solid solutions, of the defined, well crystallised compounds (such as AlN, $Al_3O_3N$,BN (hexagonal) etc), dispersed in more or less complex matrices (such as MgO, $Al_2O_3$, mixtures thereof, oxynitrides etc), solid solutions etc.

It is noteworthy that the invention can provide abrasive or refractory materials containing chemical species which would be difficult to obtain otherwise. This is the case e.g. of the finely dispersed crystallised phases of hexagonal BN (or TiN) in oxynitride or oxycarbonitride matrices, which appear without any need for BN (or TiN) as such to be prepared at a preliminary stage. The BN phases bring important advantages, particularly to refractory products, by reducing their ability to be wetted by liquid metals and thereby improving their resistance to abrasion, clogging or fouling (e.g. when they are used as nozzles for casting liquid metals such as steels, Al etc).

Another noteworthy fact is that products according to the invention can be obtained, containing chemical phases which only appear on solidification.

We claim:

1. An abrasive or refractory product consisting of at least one oxynitride of at least one metal or metalloid selected from the group consisting of Al, Mg, Ca, Sr, Ba, Ti, Zr and B and mixtures thereof, and made according to the following process:
   (a) providing a solid charge material consisting of at least one compound of said metal or metalloid, said compound containing oxygen and nitrogen and selected from oxides, nitrides and oxynitrides;
   (b) heating said charge material to a temperature high enough to form a molten mass of said charge material;
   (c) cooling the resulting molten mass to a temperature low enough to solidify said mass; and,
   (d) forming an abrasive or refractory product from the resulting cooled mass of charge material.

2. A product made according to the process set out in claim 1 wherein said metals or metalloids include at least two elements selected from Al, Mg, Ca, Sr, Ba, Ti, Zr and B.

3. A product made according to the process set out in claim 1 or 2 wherein said solid charge material includes carbides, borides or a mixture of carbides and borides of said metal or metalloid.

4. A product made according to the process set out in claim 1 or 2 wherein said solid charge material is heated in an arc furnace.

5. A product made according to the process set out in claim 1 or 2 wherein additional solid compounds are added to the molten mass formed in step (b).

6. A product according to the process set out in claim 1 or 2 wherein said molten mass is cooled by quenching.

7. A product made according to the process set out in claim 1 or 2 wherein said molten mass is cast into at least one shaped piece before being cooled and solidified.

* * * * *